(12) United States Patent
Berger et al.

(10) Patent No.: US 12,047,755 B2
(45) Date of Patent: Jul. 23, 2024

(54) DYNAMIC MICROPHONE SELECTION METHOD

(71) Applicant: SAGEMCOM BROADBAND SAS, Rueil Malmaison (FR)

(72) Inventors: Jérôme Berger, Rueil Malmaison (FR); Radu Nedelcu, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 158 days.

(21) Appl. No.: 17/702,429

(22) Filed: Mar. 23, 2022

(65) Prior Publication Data

US 2022/0312111 A1 Sep. 29, 2022

(30) Foreign Application Priority Data

Mar. 23, 2021 (FR) ....................................... 2102859

(51) Int. Cl.
| | |
|---|---|
| *H04R 29/00* | (2006.01) |
| *G10L 15/08* | (2006.01) |
| *G10L 15/22* | (2006.01) |
| *H04R 1/40* | (2006.01) |
| *H04R 3/00* | (2006.01) |

(52) U.S. Cl.
CPC ............. *H04R 3/005* (2013.01); *G10L 15/08* (2013.01); *G10L 15/22* (2013.01); *H04R 1/406* (2013.01); *H04R 29/005* (2013.01); *G10L 2015/088* (2013.01); *H04R 2201/401* (2013.01)

(58) Field of Classification Search
CPC ...... H04R 3/005; H04R 1/406; H04R 29/005; H04R 2201/401; G10L 15/08; G10L 15/22; G10L 2015/088
USPC ..................................................... 381/58, 122
See application file for complete search history.

(56) References Cited

FOREIGN PATENT DOCUMENTS

| | | | | |
|---|---|---|---|---|
| CN | 111856402 A | * | 10/2020 | ............... G01S 3/80 |
| CN | 111856402 A | | 10/2020 | |
| KR | 20190104950 A | | 9/2019 | |
| WO | WO0131972 A1 | | 5/2001 | |

* cited by examiner

*Primary Examiner* — Ammar T Hamid
(74) *Attorney, Agent, or Firm* — MUNCY, GEISSLER, OLDS & LOWE, P.C.

(57) ABSTRACT

A selection method is implemented in electronic equipment and includes steps consisting of: acquiring and memorizing, for each microphone of the equipment, a first reference audio signal produced by said microphone from a reception by the set of microphones of a first reference sound signal; analyzing the first reference audio signals to produce at least one directional parameter representative of a direction of arrival of the first reference sound signal; selecting, according to the directional parameters from among the set of microphones, the first microphones which make it possible to maximize an effectiveness of a first voice recognition method.

16 Claims, 3 Drawing Sheets

DYNAMIC MICROPHONE SELECTION METHOD

The invention relates to the field of electronic equipment which comprises microphones and which can be used to implement one or more voice recognition methods.

BACKGROUND OF THE INVENTION

Certain recent connected electronic equipment, for example connected speakers, comprise microphones and can be used to implement the voice recognition method of a virtual personal assistant.

Such electronic equipment conventionally comprises a detection module which acquires audio signals produced by the microphones. When the detection module of the electronic equipment detects that a keyword, intended to activate the voice recognition method, has been pronounced by a user, the audio signals produced by the microphones are transmitted to a voice recognition module. The voice recognition method is thus implemented by the voice recognition module which analyses the audio signals and detects the voice commands emitted by the user. The electronic equipment thus performs actions corresponding to the voice commands.

Thus, for example, the keyword "Alexa" makes it possible to activate the voice recognition method implemented by "Alexa®" from Amazon®, and the keyword "OK Google" makes it possible to activate the voice recognition method implemented by "Google Assistant®".

The voice recognition module can be integrated locally in the electronic equipment or can be remote in one or more pieces of external equipment separate from the electronic equipment, for example in one or more remote servers (on the cloud). In the latter configuration, the audio signals are transmitted by the electronic equipment to the voice recognition module via a communication network (Internet), and the voice commands are transmitted by the voice recognition module to the electronic equipment.

It is possible that electronic equipment can be used to implement two separate voice recognition methods. It is also possible that these voice recognition methods require a different number of microphones. Thus, the Alexa® voice recognition method requires six microphones, while that of Google Assistant® only requires two microphones. A connected speaker is known, for example, which comprises six microphones and which can be used to implement the two voice recognition methods of these virtual personal assistants.

The six microphones are therefore always present in the connected speaker. It is the user who chooses the voice recognition method that they wish to use (by pronouncing the appropriate keyword) and, in the case where the Google Assistant® voice recognition method is chosen, the connected speaker must select the two microphones to be used (from among the six microphones) to implement said voice recognition method.

OBJECT OF THE INVENTION

The invention aims, in electronic equipment which comprises a total number of microphones and which is used to implement a voice recognition method only requiring a reduced number of microphones, to select the microphones which make it possible to maximise the effectiveness of the voice recognition method.

SUMMARY OF THE INVENTION

In view of achieving this aim, a selection method is proposed, implemented in electronic equipment which comprises a set of microphones comprising a total number of microphones and which can be used to implement a first voice recognition method requiring a first number of first microphones strictly less than the total number of microphones, the selection method comprising steps consisting of:
acquiring and memorising, for each microphone from the set of microphones, a first reference audio signal produced by said microphone from a reception by the set of microphones of a first reference sound signal;
analysing the first reference audio signals to produce at least one directional parameter representative of an direction of arrival of the first reference sound signal;
selecting, according to the directional parameter(s), from among the set of microphones, the first microphones which make it possible to maximise an effectiveness of the first voice recognition method.

The selection method according to the invention therefore selects the first microphones according to the direction of arrival of the first reference sound signal (which, for example, comprises a keyword making it possible to activate the first voice recognition method). The selection is therefore a dynamic selection which depends on the position of the user when he pronounces the keyword and which therefore makes it possible to maximise the effectiveness of the first voice recognition method by improving its anisotropy.

Also, a selection method such as described above is proposed, wherein the first reference sound signal comprises a first keyword making it possible to activate the first voice recognition method.

Also, a selection method such as described above is proposed, wherein the first number is equal to two.

Also, a selection method such as described above is proposed, wherein the analysis step comprises steps consisting of:
determining, by using the first reference audio signals produced by the set of microphones, the direction of arrival of the first reference sound signal;
defining from among the set of microphones, pairs of microphones and, for each pair of microphones, calculating an angular difference between the direction of arrival and a direction perpendicular to a direction passing through the microphones of said pair of microphones;
and wherein the selection step consists of selecting as first microphones, the two microphones from the pair of microphones which has the smallest angular difference.

Also, a selection method such as described above is proposed, wherein the analysis step comprises steps consisting of:
defining from among the set of microphones, pairs of microphones and, for each pair of microphones, calculating a correlation value between the first reference audio signals produced by the two microphones of said pair of microphones;
and wherein the selection step consists of selecting as first microphones, the two microphones from the pair of microphones which has the highest correlation value.

Also, a selection method such as described above is proposed, wherein the analysis step comprises steps consisting of:

determining, by using the first reference audio signals produced by the set of microphones, the direction of arrival of the first reference sound signal;

defining from among the set of microphones, pairs of microphones and, for each pair of microphones:
- configuring a path formation module using the microphones from said pair of microphones to focus the path formation module in the direction of arrival;
- applying, at the input of the path formation module, the first reference audio signals produced by the two microphones from said pair of microphones, and acquiring an output signal from the path formation module;
- applying a detection method aiming to detect the first keyword in the output signal, and conferring to the pair of microphones, a confidence score quantifying a probability of detecting the first keyword;

and wherein the selection step consists of selecting as first microphones, the two microphones from the pair of microphones which has the highest confidence score.

Also, a selection method such as described above is proposed, wherein the two microphones from each pair of microphones have one same spacing.

Also, a selection method such as described above is proposed, wherein at least three microphones from the set of microphones are not aligned.

Also, a selection method such as described above is proposed, wherein the electronic equipment can also be used to implement a second voice recognition method requiring a second number of second microphones, equal to the total number of microphones.

Also, a selection method such as described above is proposed, wherein the first voice recognition method is implemented in one or more pieces of external equipment separate from the electronic equipment, the selection method comprising the step, following the selection of the first microphones, to transmit to the external equipment only from the first audio command signals produced by said first microphones following the first reference audio signals, said first audio command signals being used by the piece(s) of electronic equipment to implement the first voice recognition method.

In addition, electronic equipment is proposed comprising a processing component and a set of microphones comprising a total number of microphones, the electronic equipment being arranged to be used to implement a first voice recognition method requiring a first number of first microphones strictly less than the total number of microphones, the processing component being arranged to implement the selection method such as described above.

Also, electronic equipment such as described above is proposed, the electronic equipment being a connected speaker.

Also, a computer program comprising instructions which cause the processing component of the electronic equipment such as described above is proposed, to execute the steps of the selection method such as described above.

Furthermore, a computer-readable recording medium is proposed, on which the computer program such as described above is recorded.

The invention will be best understood in the light of the description below of particular, non-limiting embodiments of the invention.

BRIEF DESCRIPTION OF THE DRAWINGS

Reference will be made to the appended drawings, among which.

DETAILED DESCRIPTION OF THE INVENTION

Figure 1:
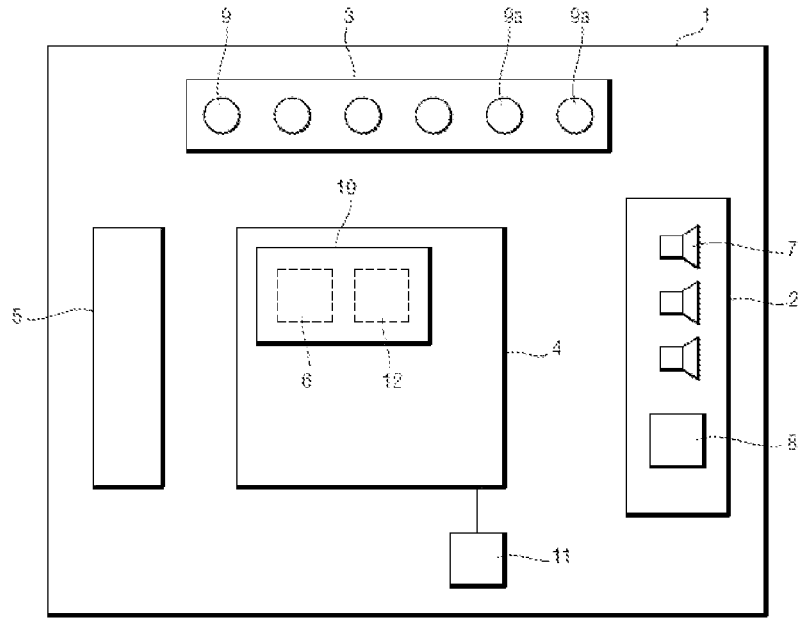
FIG. 1 schematically represents a connected speaker, in which is implemented the selection method according to the invention.

In reference to FIG. 1, the invention is here implemented in a connected speaker 1 which comprises an audio return device 2, a set of microphones 3, a processing module 4, a communication module 5 and a detection module 6.

The audio return device 2 comprises a plurality of loudspeakers 7, as well as components 8 arranged to process and transmit audio signals to be returned to the loudspeakers.

The set of microphones 3 comprises a total number of microphones 9, here equal to six. The six microphones 9 are here arranged in a circle.

The processing module 4 comprises a processing component 10 which is adapted to executing instructions of a program to implement the selection method according to the invention. The program is stored in a memory 11 connected to or integrated in the processing component 10. The processing component 10 is, for example, a processor, a microcontroller, a DSP (Digital Signal Processor), or a programmable logic circuit such as an FPGA (Field Programmable Gate Array) or an ASIC (Application Specific Integrated Circuit).

The communication module 5 implements a wireless connection using here a Wi-Fi protocol. The communication module 5 makes it possible to connect the connected speaker 1 to a residential gateway located in the dwelling of the user of the connected speaker 1. The connected speaker 1 can thus be connected to a communication network (for example, Internet) via its communication module 5 and the residential gateway.

It is noted that the connection could be another wireless connection (for example, a Bluetooth® connection), or a wired connection.

The detection module 6 is here programmed in the processing component 10. The detection module 6 acquires the audio signals produced by the microphones 9 from the set of microphones 3.

The connected speaker 1 can be used to implement two separate voice recognition methods, each belonging to a separate virtual personal assistant.

The first voice recognition method is activated by the detection of a first keyword by the detection module 6. The first voice recognition method requires a first number of first microphones 9a strictly less than the total number of microphones 9. The first number is here equal to two. The first voice recognition method is implemented in a first voice recognition module integrated in one or more first servers of the cloud.

The second voice recognition method, belonging to a second virtual personal assistant, is activated by the detection of a second keyword by the detection module 6. The second voice recognition method requires six microphones 9, i.e. here all the microphones 9 from the set of microphones 3. The second voice recognition method is implemented in a second voice recognition module integrated in one or more second servers of the cloud.

When the detection module 6 detects the first keyword, the two first microphones 9a capture sound command signals pronounced by the user and produce first audio command signals. The communication module 5 transmits the first audio command signals to the residential gateway and to the first voice recognition module via the communication network.

The first voice recognition module thus implements the first voice recognition module and the voice commands pronounced by the user are detected and interpreted, then retransmitted to the connected speaker 1.

The first voice recognition module implements a first path formation method which makes it possible for it to focus the direction in which it listens and to ignore the sounds coming from a direction other than that of the user (beamforming).

When the detection module 6 detects the second keyword, the six microphones 9 capture the sound command signals pronounced by the user and produce second audio command signals. This time, the second path formation method is performed in the connected speaker 1. The connected speaker 1 produces one single signal which is sent by itself to the second voice recognition module (on the second server(s)). The second voice recognition module thus implements the second voice recognition method and the voice commands pronounced by the user are detected and interpreted, then retransmitted to the connected speaker 1. Of course, the second path formation method could also be performed by the second server(s) (as is the case for the first voice recognition method which is performed by the first server(s)).

It is noted that the greater the number of microphones used by the voice recognition method, and the greater the calculation power necessary to process the audio signals will be, but the more effective the method will be to ignore disturbances.

Figure 2:
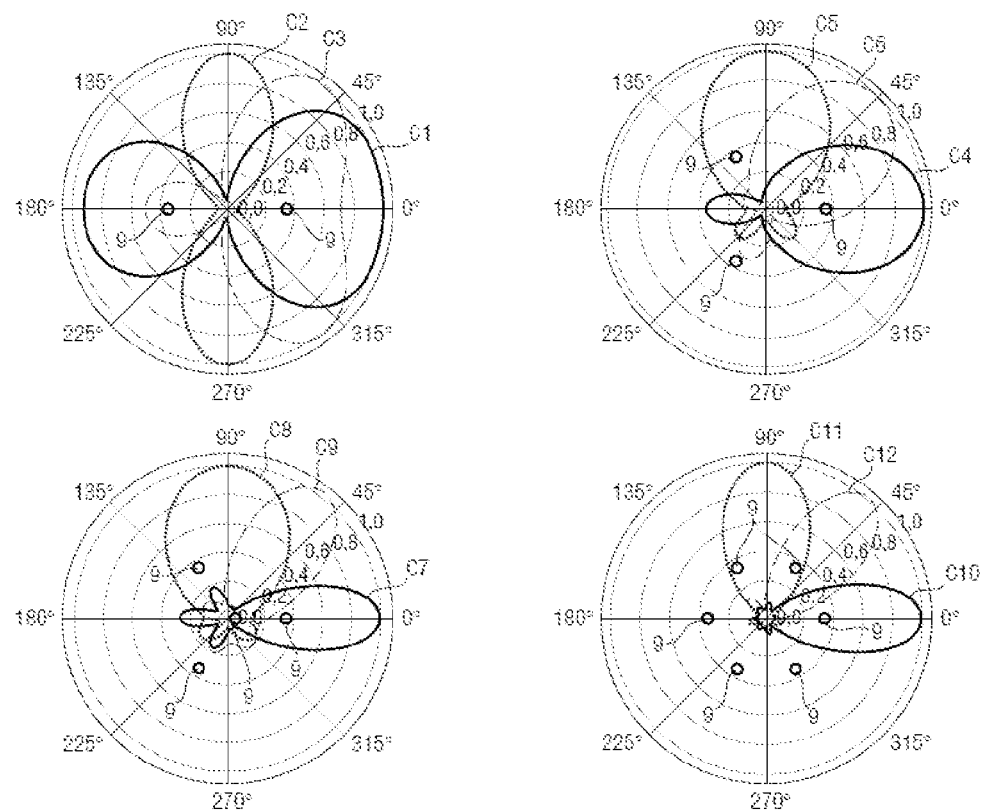
FIG. 2 represents four sensitivity diagrams each associated with a separate arrangement of microphones, and each comprising three curves obtained by the implementation of a path formation method focused in three separate directions.

FIG. 2 makes it possible to generally illustrate the operation of the path formation mechanism.

FIG. 2 comprises four graphs which each show a top view of a separate usual arrangement of microphones 9, and which each comprise a sensitivity diagram corresponding to the arrangement in question.

Each sensitivity diagram comprises three curves obtained by the implementation of a path formation method focused in three separate directions: 0°, 45° and 90°.

The sensitivity diagram at the top-left in FIG. 2 corresponds to an arrangement of microphones in which two microphones 9 are located on either side of the centre of the graph.

The sensitivity diagram at the top-right in FIG. 2 corresponds to an arrangement of microphones in which three microphones are arranged in a triangle.

The sensitivity diagram at the bottom-left in FIG. 2 corresponds to an arrangement of microphones in which four microphones are arranged in a "trillium" (i.e. three microphones arranged in a triangle and a fourth microphone in the centre).

The sensitivity diagram at the bottom-right in FIG. 2 corresponds to an arrangement of microphones in which six microphones are arranged in a circle by being regularly distributed.

When the voice recognition module is configured to listen in the 0° direction, it can be seen on the curve C1 that the voice recognition module has a sensitivity equal to 1 in the 0° direction, then the sensitivity decreases progressively until a sensitivity of 0 at 90° before rising to 0.9 at 180°. Consequently, the voice recognition module will actually hear the sounds coming from the 0° direction (chosen direction), will not be disturbed by the sounds coming from the 90° direction, but risks being disturbed by the sounds coming from the 180° direction (direction opposite the chosen direction).

When the voice recognition module is configured to listen in the 90° direction, a similar behaviour can be seen on the curve C2, but with lobes that are a lot narrower. Consequently, the voice recognition module will be less disturbed by sounds coming from directions close to the chosen direction.

The curve C3 corresponds to a configuration to listen in the 45° direction.

Also, on the diagram at the top-right, the curve C4 corresponding to a configuration to listen in the 0° direction, the curve C5 corresponding to a configuration to listen in the 90° direction, the curve C6 corresponding to a configuration to listen in the 45° direction can also be found.

Also, on the diagram at the bottom-left, the curve C7 corresponding to a configuration to listen in the 0° direction, the curve C8 corresponding to a configuration to listen in the 90° direction, the curve C9 corresponding to a configuration to listen in the 45° direction can also be found.

Also, on the diagram at the bottom-right, the curve C10 corresponding to a configuration to listen in the 0° direction, the curve C11 corresponding to a configuration to listen in the 90° direction, the curve C12 corresponding to a configuration to listen in the 45° direction can also be found.

The diagrams in FIG. 2 which correspond to the connected speaker 1 are the diagrams at the top-left and at the bottom-right since, as has been seen, the first voice recognition method uses two first microphones 9a and the second voice recognition method uses six microphones 9.

The path formation method combines the different signals coming from microphones to obtain one single combined output signal according to the following formula:

$$x(t)=\Sigma_{i=1}^{N}g_ix_i(t-\delta_i),$$

where:
N is the number of microphones used;
xi(t) is the audio signal produced by the microphone i;
gi and δi are a yield and a delay applied to the audio signal produced by the microphone i;
x(t) is the output signal.

The choice of coefficients gi and δi makes it possible to determine the direction in which the voice recognition module focuses its listening.

In order to choose the direction in which the path formation method focuses its listening, the voice recognition module generally uses a method for detecting the direction of arrival, or "DoA". This method measures the delays in receiving the sound signal by the different microphones 9, which result from the time difference of propagation of the sound signal from the user to each microphone 9, and analyses these delays to determine the direction of arrival of the sound signal. Several analysis methods can be used, from among which a method using a periodogram, a method using the MUSIC ("Multiple Signal Classification") algorithm, a method using the SAMV ("iterative Sparse Asymptotic Minimum Variance") algorithm, the MLE ("Maximum Likelihood Estimation") method, the ESPRIT ("Estimation of Signal Parameters via Rotational Invariant Techniques") method, etc. are found.

Now, the selection method according to the invention is now more specifically described.

As has been seen, the first voice recognition method requires to use two first microphones 9a only from among the six microphones 9 of the connected speaker 1.

The selection method aims to select, when the first voice recognition method is used, the two first microphones 9a, from among the set of microphones 3 of the connected speaker 1, which make it possible to maximise the effectiveness of the first voice recognition method. By "maximise the effectiveness", this means that the two first microphones 9a are those which make it possible to obtain the most reliable and the most precise voice recognition. The selection method according to the invention is implemented in the processing component 10 of the connected speaker 1.

It is noted that, when it is the second voice recognition method which is used, it is not necessary to select microphones 9, since all the microphones 9 from the set of microphones 3 are used.

To select the two first microphones 9a, the processing component 10 acquires and memorises, for each microphone 9 from the set of microphones 3, a first reference audio signal produced by said microphone 9 from a reception by the set of microphones 3 of a first reference sound signal. The first reference sound signal is pronounced by the user and comprises the first keyword which makes it possible to activate the first voice recognition method. Then, the processing component 10 analyses the first reference audio signals to produce at least one directional parameter representative of a direction of arrival of the first reference sound signal. The processing component 10 thus selects, according to the directional parameter(s), from among the set of microphones 3, the two first microphones 9a which make it possible to maximise the effectiveness of the first voice recognition method.

The selection of the pair of first microphones 9a is therefore performed according to the direction from where the keyword came.

Figure 3:
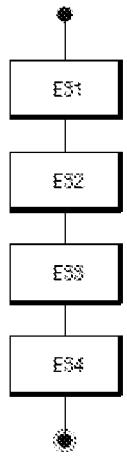
FIG. 3 represents steps of the selection method according to a first embodiment of the invention.
Figure 4:
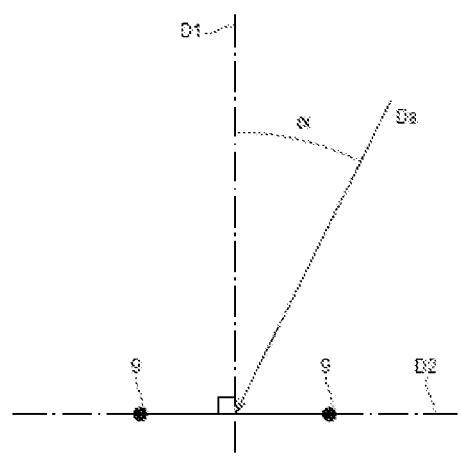
FIG. 4 represents a pair of microphones and the direction of arrival of a first reference sound signal.

The selection method according to a first embodiment of the invention is now described, in reference to FIGS. 3 and 4.

The selection method is therefore implemented when the detection module 6 of the connected speaker 1 has detected that the user has pronounced the first keyword to activate the first voice recognition method.

The processing component 10 acquires and memorises the first reference audio signals, then analyses them.

The processing component 10 determines, by using the first reference audio signals produced by the set of microphones 3, the direction of arrival Da of the first reference sound signal integrating the first keyword (step E31). The processing component 10 applies for this, a DoA method to the first reference audio signals coming from all the microphones 9 from the set of microphones 3.

Then, the processing component 10 defines pairs of microphones 9 in the set of microphones 3.

Advantageously, but not necessarily, the two microphones 9 of each pair of microphones have the same spacing. Each microphone 9 from the set of microphones 3 can form part of one or more pairs, or do not form part of any pair.

For each pair of microphones 9 from the set of microphones 3, the processing component 10 calculates an angular difference a between the direction of arrival Da and a direction D1 perpendicular to a direction D2 passing through the microphones 9 of said pair of microphones 9 (step E32).

The direction of arrival Da and the angular differences α are the directional parameters which have been mentioned above.

The processing component 10 thus selects, as first microphones 9a, the two microphones 9 of the pair of microphones 9 which has the smallest angular difference (step E33).

Following the selection of the first microphones 9a, the processing component 10 transmits to the first voice recognition module (on the cloud) by using the communication module 5, the first audio command signals produced by said first microphones 9a (and only by the first microphones 9a): step E34.

The first audio command signals are thus used by the first voice recognition module to implement the first voice recognition method. The first audio command signals are the signals produced by the first microphones 9a when these capture the voice commands pronounced by the user following the pronouncement of the first keyword.

The selection method is therefore clearly more effective than a selection method which would statically, definitively select, the microphones. For example, in the case where the six microphones are arranged in a regular circle, the static choice of two diametrically opposite microphones and parallel to the front face of the connected speaker is the optimal solution, when the user is located opposite the connected speaker, but the quality of the voice recognition decreases when the user is not located opposite the connected speaker. Here, the selection method according to the invention makes it possible to optimise the choice of the first microphones dynamically, by considering the direction of arrival of the first reference sound signal.

Figure 5:
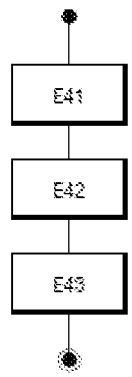
FIG. 5 represents steps of the selection method according to a second embodiment of the invention.

The selection method according to a second embodiment of the invention is now described, in reference to FIG. 5.

The selection method is implemented when the detection module 6 of the connected speaker 1 has detected that the user has pronounced the first keyword.

The processing component 10 acquires and memorises the first reference audio signals, then analyses them.

For each pair of microphones 9 from the set of microphones 3, the processing component 10 calculates a correlation value between the first reference audio signals produced by the two microphones 9 of said pair of microphones 9 (step E41). The correlation values are the directional parameters which have been mentioned above. The correlation is indeed maximum when the sound comes precisely from the direction perpendicular to the pair of microphones 9, and minimum when the sound comes from a direction precisely aligned with the microphones 9.

The processing component 10 thus selects as first microphones 9a, the two microphones 9 of the pair of microphones 9 which has the highest correlation value (step E42).

Following the selection of the first microphones 9a, the processing component 10 transmits to the first voice recognition module (on the cloud), by using the communication module 5, the first audio command signals produced by said first microphones 9a (and only by the first microphones 9a): step E43.

The first audio command signals are thus used by the first voice recognition module to implement the first voice recognition method.

It is noted that the correlation values are relevant and sufficient directional parameters.

Indeed, it is not necessary in the invention to specifically know the direction of arrival of the first reference sound signal: it is sufficient to know the pair of microphones 9 which has the closest direction to the direction of arrival as a perpendicular.

The implementation of the selection method according to the second embodiment of the invention is less expensive than that of the selection method according to the first embodiment of the invention, as it does not require any DoA method which can be an expensive method.

The selection method according to the third embodiment of the invention is now described.

Preliminarily, the path formation method implemented by the voice recognition module (on the cloud) is interesting.

Figure 6:
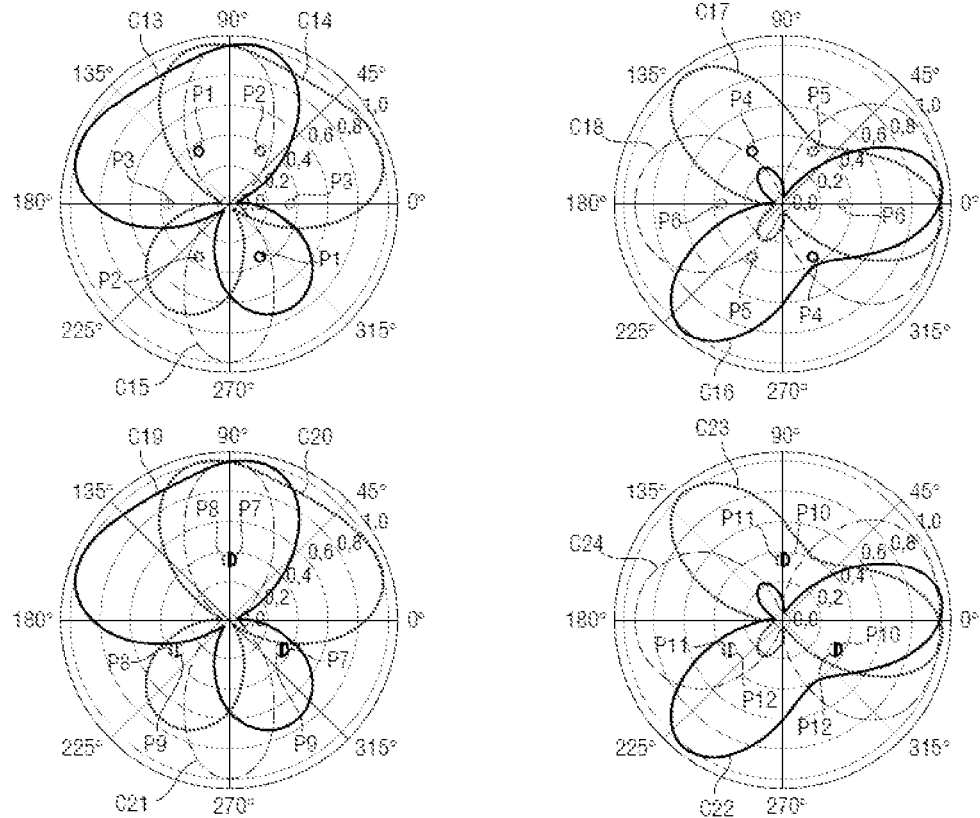
FIG. 6 represents four sensitivity diagrams associated with two separate arrangements of microphones and with two focalisation directions of a path formation method, each sensitivity diagram comprising three curves obtained by the implementation of the path formation method following the selection of three separate pairs of microphones.

The two sensitivity diagrams at the top in FIG. 6 correspond to an arrangement of six microphones in a circle. The six microphones are grouped together in three pairs, each composed of two diametrically opposite microphones.

The two sensitivity diagrams at the bottom in FIG. 6 correspond to an arrangement with three microphones in a triangle. The three microphones 9 are grouped together in three pairs corresponding to the three sides of the triangle.

On the two graphs on the left, the path formation method is configured to listen in the 90° direction.

On the two graphs on the right, the path formation method is configured to listen in the 0° direction.

On the graph at the top-left, the curve C13 corresponds to the pair of microphones P1, the curve C14 corresponds to the pair of microphones P2, the curve C15 corresponds to the pair of microphones P3.

On the graph at the top-right, the curve C16 corresponds to the pair of microphones P4, the curve C17 corresponds to the pair of microphones P5, the curve C18 corresponds to the pair of microphones P6.

On the graph at the bottom-left, the curve C19 corresponds to the pair of microphones P7, the curve C20 corresponds to the pair of microphones P8, the curve C21 corresponds to the pair of microphones P9.

On the graph at the bottom-right, the curve C22 corresponds to the pair of microphones P10, the curve C23 corresponds to the pair of microphones P11, the curve C24 corresponds to the pair of microphones P12.

As has been seen already, in the invention, when the detection module 6 of the connected speaker 1 detects that the user has pronounced the first keyword, the processing component 10 selects a pair of first microphones 9a according to the direction of arrival of the first reference sound signal containing the first keyword, and sends the first audio command signals coming from these two first microphones 9a to the first voice recognition module to implement the first voice recognition method. The first voice recognition module thus applies the first path formation method.

For example, if the processing component 10 of the connected speaker 1 detects that the first keyword comes from the 90° direction, thus the connected speaker 1 will send the first audio command signals coming from the two microphones of one of the pairs P3 or P9 (case corresponding to the two graphs on the left). The application of the path formation method will make it possible for the voice recognition module to obtain one of the curves C15 or C21.

However, if the processing component 10 of the connected speaker 1 detects that the first keyword comes from the 0° direction, then the connected speaker 1 will send the first audio command signals coming either from the two microphones of one of the pairs P4 or P10, or from the two microphones of one of the pairs P5 or P11 (case corresponding to the two graphs on the right) such that the voice recognition module obtains the best sensitivity diagram in each situation.

It can be seen in FIG. 6 that the sensitivity diagram of each pair of microphones 9 has significant secondary lobes, i.e. that the output signal produced by the path formation method comprises a significant part coming from at least one direction other than the focused direction. For example, on the sensitivity diagrams on the right in FIG. 6, when the path formation method is focused towards the 0° direction, the pairs of microphones P5 and P11 are sensitive to the sounds coming from the 0° and 130° directions, while the pairs of microphones P4 and P10 are sensitive to the sounds coming from the 0° and 230° directions. Consequently, it seems preferable to choose one of the pairs of microphones P4 or P10 if there is a disturbing sound source in the 130° direction, and, on the contrary, it seems preferable to choose one of the pairs of microphones P5 or P11 if there is a disturbing sound source in the 230° direction. It can even be preferable to choose one of the pairs of microphones P6 or P12, although they are initially less selective if there are disturbing sources in the 130° and 230° directions.

Figure 7:
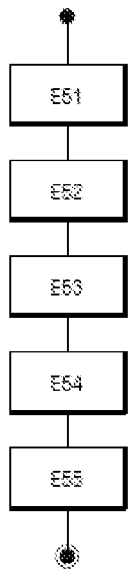
FIG. 7 represents steps of the selection method according to a third embodiment of the invention.

In reference to FIG. 7, the selection method according to the third embodiment of the invention aims to consider these disturbances, and to select the pair of first microphones 9a which will make it possible for the first voice recognition module to maximise the effectiveness of the first voice recognition method by anticipating the results of the path formation method used by the first voice recognition module.

The selection method is therefore implemented when the detection module 6 of the connected speaker 1 has detected that the user has pronounced the first keyword to activate the first voice recognition method.

The processing component 10 acquires and memorises the first reference audio signals produced by the set of microphones 3, then analyses them.

The processing component 10 determines, by using the first reference audio signals, the direction of arrival of the first reference sound signal integrating the first keyword (step E51). The processing component 10 applies for that, a DoA method to the first reference audio signals coming from all the microphones 9 from the set of microphones 3.

Then, for each pair of microphones 9 from the set of microphones 3, the processing component 10 configures a path formation module 12 (which implements a path formation method) using the microphones 9 of said pair of microphones 9 to focus the path formation module 12 in the direction of arrival (step E52). The path formation module 12 can be seen in FIG. 1.

In step E53, the processing component 10 thus applies at the input of the path formation module 12, the first reference audio signals produced by the two microphones 9 of said pair of microphones 9, and acquires an output signal from the path formation module 12.

The processing component 10 thus applies a detection method (by using the detection module 6) aiming to detect the first keyword in the output signal, and confers to the pair of microphones, a confidence score quantifying a probability of detecting the first keyword.

The processing component 10 therefore confers to each pair of microphones 9 from the set of microphones 3, a confidence score going here from 0% (the first keyword is not detected) to 100% (the first keyword is detected without any doubt). It is noted that, during a traditional use of the keyword detector, this confidence score would be compared with a threshold to produce a "detected keyword" binary decision or not. Here, the confidence score is used directly.

The processing component 10 thus selects as first microphones 9a, the two microphones 9 of the pair of microphones 9 which has the highest confidence score (step E54).

In the third embodiment of the invention, the reception quality of the keyword is therefore used to evaluate the pair of microphones which will make it possible to obtain the most effective voice recognition (by considering the use of the path formation method).

Following the selection of the first microphones 9a, the processing component 10 transmits to the first voice recognition module (on the cloud) by using the communication module 5, the first audio command signals by said first microphones 9a (and only by the first microphones 9a): step E55.

Of course, the invention is not limited to the embodiments described, but comprises any variant entering into the scope of the invention such as defined by the claims.

The voice recognition module is not necessarily implemented in one or more pieces of remote external equipment as is the case here for the server(s) of the cloud. The voice recognition module could be implemented in the connected speaker 1, for example in the processing module 4.

The number and the arrangement of the microphones 9 could of course be different. The connected speaker 1 could for example comprise four microphones arranged in a "trillium" (i.e. three microphones arranged in a triangle and a fourth microphone in the centre), as on the graph at the bottom-left in FIG. 2, or three microphones.

The connected speaker 1 could be used to implement any number of voice recognition method(s).

The architecture of the connected speaker 1 can be different from that described here. The detection module 6 is not for example necessarily programmed in the processing component 10.

The invention can be implemented in any electronic equipment comprising microphones and which could be used to implement a voice recognition method: voice assistant, set-top box, tablet, smartphone, etc.

The invention claimed is:

1. A selection method, implemented in electronic equipment which comprises a set of microphones comprising a total number of microphones and which can be used to implement a first voice recognition method requiring a first number of first microphones strictly less than the total number of microphones, the selection method comprising steps consisting of:
   acquiring and memorizing, for each microphone from the set of microphones, a first reference audio signal produced by said microphone from a reception by the set of microphones of a first reference sound signal, the first reference sound signal comprising a first keyword making it possible to activate the first voice recognition method;
   analyzing the first reference audio signals to produce at least one directional parameter representative of a direction of arrival (Da) of the first reference sound signal;
   selecting, according to the directional parameter(s), from among the set of microphones, the first microphones which make it possible to maximize an effectiveness of the first voice recognition method.

2. The selection method according to claim 1, wherein the first number is equal to two.

3. The selection method according to claim 2, wherein the analysis step comprises steps of:
   determining, by using the first reference audio signals produced by the set of microphones, the direction of arrival of the first reference sound signal;
   defining from among the set of microphones, pairs of microphones and, for each pair of microphones, calculating an angular difference between the direction of arrival and a direction perpendicular to a direction passing through the microphones of said pair of microphones;
   and wherein the selection step consists of selecting as first microphones, the two microphones of the pair of microphones which has the smallest angular difference.

4. The selection method according to claim 2, wherein the analysis step comprises steps consisting of:
   defining from among the set of microphones, pairs of microphones and, for each pair of microphones, calculating a correlation value between the first reference audio signals produced by the two microphones of said pair of microphones;
   and wherein the selection step consists of selecting as first microphones, the two microphones of the pair of microphones which has the highest correlation value.

5. The selection method according to claim 2, wherein the analysis step comprises steps consisting of:
   determining, by using the first reference audio signals produced by the set of microphones, the direction of arrival of the first reference sound signal;
   defining from among the set of microphones, pairs of microphones and, for each pair of microphones:
      configuring a path formation module using the microphones of said pair of microphones to focus the path formation module in the direction of arrival;
      applying at the input of the path formation module, the first reference audio signals produced by the two microphones of said pair of microphones, and acquiring an output signal from the path formation module;
      applying a detection method aiming to detect the first keyword in the output signal, and conferring to the pair of microphones, a confidence score quantifying a probability of detecting the first keyword;
   and wherein the selection step consists of selecting as first microphones, the two microphones of the pair of microphones which has the highest confidence score.

6. The selection method according to claim 3, wherein the two microphones of each pair of microphones have one same spacing.

7. The selection method according to claim 1, wherein at least three microphones from the set of microphones are not aligned.

8. The selection method according to claim 1, wherein the electronic equipment can also be used to implement a second voice recognition method requiring a second number of second microphones equal to the total number of microphones.

9. The selection method according to claim 1, wherein the first voice recognition method is implemented in one or more piece(s) of external equipment separate from the electronic equipment, the selection method comprising the step, following the selection of the first microphones, consisting of transmitting at least the piece(s) of external equipment only from the first audio command signals produced by said first microphones following the first reference audio signals, said first audio command signals being used by the piece(s) of external equipment to implement the first voice recognition method.

10. An electronic equipment comprising a processing component and a set of microphones comprising a total number of microphones, the electronic equipment being arranged to be used to implement a first voice recognition method requiring a first number of first microphones strictly less than the total number of microphones, the processing component being arranged to implement the selection method according to claim 1.

11. An electronic equipment comprising a processing component and a set of microphones comprising a total number of microphones, the electronic equipment being arranged to be used to implement a first voice recognition method requiring a first number of first microphones strictly less than the total number of microphones, wherein the processing component is arranged to implement the selection method according to claim 6, the two microphones of each pair of microphones having one same spacing.

12. An electronic equipment comprising a processing component and a set of microphones comprising a total number of microphones, the electronic equipment being arranged to be used to implement a first voice recognition method requiring a first number of first microphones strictly less than the total number of microphones, wherein the processing component is arranged to implement the selection method according to claim 7, at least three microphones from the set of microphones not being aligned.

13. An electronic equipment comprising a processing component and a set of microphones comprising a total number of microphones, the electronic equipment being arranged to be used to implement a first voice recognition method requiring a first number of first microphones strictly less than the total number of microphones, wherein the processing component is arranged to implement the selection method according to claim 8, the electronic equipment being able to also be used to implement the second voice recognition method requiring the second number of second microphones equal to the total number of microphones.

14. An electronic equipment comprising a processing component and a set of microphones comprising a total number of microphones, the electronic equipment being arranged to be used to implement a first voice recognition method requiring a first number of first microphones strictly less than the total number of microphones, wherein the processing component is arranged to implement the selection method according to claim 9.

15. The electronic equipment according to claim 10, the electronic equipment being a connected speaker.

16. A non-transitory computer readable medium storing a computer program comprising instructions which cause the processing component of the electronic equipment according to claim 10 to execute the steps of a selection method, implemented in electronic equipment which comprises a set of microphones comprising a total number of microphones and which can be used to implement a first voice recognition method requiring a first number of first microphones strictly less than the total number of microphones, the selection method comprising steps consisting of:
  acquiring and memorizing, for each microphone from the set of microphones, a first reference audio signal produced by said microphone from a reception by the set of microphones of a first reference sound signal, the first reference sound signal comprising a first keyword making it possible to activate the first voice recognition method; analyzing the first reference audio signals to produce at least one directional parameter representative of a direction of arrival of the first reference sound signal;
  selecting, according to the directional parameter(s), from among the set of microphones, the first microphones which make it possible to maximize an effectiveness of the first voice recognition method.

\* \* \* \* \*